(12) United States Patent
Fu

(10) Patent No.: US 8,053,384 B2
(45) Date of Patent: Nov. 8, 2011

(54) OPTICAL GLASS

(75) Inventor: Jie Fu, Kanagawa (JP)

(73) Assignee: Ohara Inc., Kanagawa (JP)

( * ) Notice: Subject to any disclaimer, the term of this patent is extended or adjusted under 35 U.S.C. 154(b) by 231 days.

(21) Appl. No.: 12/078,640

(22) Filed: Apr. 2, 2008

(65) Prior Publication Data

US 2008/0248941 A1 Oct. 9, 2008

(30) Foreign Application Priority Data

Apr. 3, 2007 (JP) ................. 2007-097466
Apr. 25, 2007 (JP) ................. 2007-115425
Apr. 25, 2007 (JP) ................. 2007-115426

(51) Int. Cl.
*C03C 3/15* (2006.01)
*C03C 3/14* (2006.01)
*C03C 3/155* (2006.01)

(52) U.S. Cl. ................. 501/50; 501/49; 501/51
(58) Field of Classification Search ........... 501/49, 501/50, 51

See application file for complete search history.

(56) References Cited

U.S. PATENT DOCUMENTS

| 4,732,875 | A  | * | 3/1988  | Sagara ............... 501/42    |
| 5,245,492 | A  | * | 9/1993  | Mizuno et al. ......... 360/125.01 |
| 7,033,966 | B2 | * | 4/2006  | Kobayashi et al. ....... 501/41  |
| 7,098,158 | B2 | * | 8/2006  | Natsugari et al. ....... 501/78  |
| 7,514,381 | B2 | * | 4/2009  | Matsumoto et al. ...... 501/50   |
| 7,524,781 | B2 | * | 4/2009  | Nagashima et al. ...... 501/50   |
| 7,563,736 | B2 | * | 7/2009  | Kobayashi et al. ....... 501/50  |
| 2003/0191006 | A1 | * | 10/2003 | Natsugari et al. ....... 501/49 |
| 2006/0100084 | A1 | * | 5/2006  | Nagashima et al. ...... 501/49  |
| 2006/0194686 | A1 | * | 8/2006  | Kobayashi et al. ....... 501/50 |
| 2007/0105702 | A1 | * | 5/2007  | Matsumoto et al. ...... 501/50  |

FOREIGN PATENT DOCUMENTS

| JP | 60-051623     |   | 3/1985  |
| JP | H01-308843 A  |   | 12/1989 |
| JP | H08-073229 A  |   | 3/1996  |
| JP | H08-319124 A  |   | 12/1996 |
| JP | 2004-043294 A |   | 2/2004  |
| JP | 2005015302 A  | * | 1/2005  |
| JP | 2005-154251 A |   | 6/2005  |
| JP | 2006-131450 A |   | 5/2006  |
| JP | 2006131450 A  | * | 5/2006  |
| JP | 2006-182577 A |   | 7/2006  |

OTHER PUBLICATIONS

Derwent Abstract 2005-399482, English Abstract of JP 2005-154251 A Jun. 16, 2005.*
Derwent Abstract 2006-475424, English Abstract of JP 2006-182577 A Jul. 13, 2006.*
Machine translation of JP 2006-182577 A, Yabuuchi, Jul. 13, 2006.*
"Measuring Method for Refractive Index of Optical Glass," Japanese Optical Glass Industrial Standards, Mar. 14, 2008, Title/Contents: pp. 1-2, Standard: pp. 01-1 to 01-3, JOGIS Jan. 2003, Japan Optical Glass Manufacturers' Association, Japan.
"Measuring Method for Thermal Expansion of Optical Glass," Japanese Optical Glass Industrial Standards, Mar. 14, 2008, Title/Contents: pp. 1-2, Standard: pp. 08-1 to 08-3, JOGIS Aug. 2003, Japan Optical Glass Manufacturers' Association, Japan.

* cited by examiner

*Primary Examiner* — Karl Group
*Assistant Examiner* — Elizabeth A Bolden
(74) *Attorney, Agent, or Firm* — Hoffmann & Baron, LLP

(57) ABSTRACT

A glass composition being suitable for precision mold press forming, having superior resistance to devitrification, having optical constants (a refractive index, an Abbe number, and the like) required for aspherical lenses, and a low glass transition temperature. There is provided an optical glass comprising no less than 5 mol % and no more than 60 mol % of a $B_2O_3$ component, and no less than 0.2 mol % and no more than 60 mol % of a $TeO_2$ component, by mol % on the basis of oxides. Further, there is provided an optical glass mentioned above having optical constants with a refractive index ($n_d$) of 1.80 to 2.20, and an Abbe number ($v_d$) of 16 to 40. Still further, there is provided an optical glass mentioned above having a glass transition temperature (Tg) of no more than 680° C.

29 Claims, No Drawings

OPTICAL GLASS

This application is based on and claims the benefit of priority from Japanese Patent Application No. 2007-097466, filed on 3 Apr. 2007, Japanese Patent Application No. 2007-115425, filed on 25 Apr. 2007 and Japanese Patent Application No. 2007-115426, filed on 25 Apr. 2007, the content of which is incorporated herein by reference.

BACKGROUND OF THE INVENTION

1. Field of the Invention

The present invention relates to optical glass which has a high refractive index, a high dispersion and further a low glass transition temperature (Tg), and is suitable for the precision press molding (the precision mold press forming).

2. Related Art

In recent years, with the advent of digital cameras, the degree of integration and the high degree of functionality of devices employing optical systems advance rapidly. At the same time, the demand for a high precision, lightweight, compact optical system has been increasing. To meet the above demand, optical designs employing aspherical lenses have been increasingly coming in the mainstream. Then, in order to stably supply a large amount of aspherical lenses employing a highly functional glass at a low cost, a mold pressing technique in which an optical surface is directly formed without steps of grinding or polishing has attracted attention. The demand for optical glass having high functionality (for example, a high refractive index and low dispersion properties/high refractive index and high dispersion properties and the like) has been increasing year by year.

The precision press molding of glass is a method to obtain a glass form having a shape of the final product or extremely close to the final product, and with face precision, and according to the precision press molding, a mold with a desired shape can be manufactured with a high rate of productivity. Then, at present, many kinds of optical glass parts such as spherical lenses, aspherical lenses, diffraction gratings, and the like are manufactured by precision press molding. Not surprisingly, in order to obtain an optical glass part by precision press molding, it is necessary to perform press forming of a glass preform under high temperature. Thus, the mold used for the press is exposed to a high temperature, and high pressure is applied thereto. For the above reason, from the view point of suppressing damage to the mold itself or the parting film provided on the inside surface of the mold, caused by the high temperature environment of the press molding, the glass transition temperature of the glass preform is preferred to be as low as possible. In addition, devitrification is not eliminated in the glass preform material by precision press molding of a glass preform material in which devitrification has formed, and a glass mold containing devitrification cannot be used as an optical element. Thus, a high resistance to devitrification is required for the glass of a glass preform material to be used in the precision press molding.

Conventionally, an optical glass having a high refractive index and high dispersion is represented by a composition containing a large amount of lead oxides, and has superior stability and a low glass transition temperature, and thus has been used for precision mold press forming. For example, the Japanese Patent Application, First Publication No. 1989-308843 discloses an optical glass containing a large amount of lead oxides used for the precision mold press forming.

However, in performing the precision mold press forming, it is maintained in a reductive atmosphere in order to protect the mold from oxidation, and therefore, when lead oxide is contained in the glass component, there is a problem in that the precision face of the die could not be maintained due to the adhesion of the reduced lead precipitated on the surface of the glass to the surface of the die. In addition, since lead oxide is harmful to the environment, glass that does not contain lead oxide has been desired.

Then, as the optical glass for the press molding that has a high refractive index and a high dispersion and does not contain lead oxide, various kinds of glass containing $TeO_2$ component and the like have been developed, such as those disclosed in Japanese Patent Application, First Publication Nos. 2004-43294, 2005-154251 and 2006-182577.

SUMMARY OF THE INVENTION

However, the glass disclosed in Japanese Patent Application, First Publication No. 2004-43294 has a problem in the point of the glass transition temperature is low, because it contains 20 mol % or more of $TeO_2$ component and in the point of the chemical durability and resistance to devitrification is low, because the total content of $TeO_2$ component and ZnO component exceeds 70 mol %. In addition, the glass disclosed in Japanese Patent Application, First Publication No. 2005-154251 is an optical glass of $B_2O_3$—ZnO—$La_2O_3$—$Ga_2O$ type containing 0 to 20 mol % of $TeO_2$ component, and has a low glass transition temperature, a high refractive index, and high transmittance; however, it contains a $Ga_2O_3$ component, which is expensive, in order to obtain high functionality such as the stability of the glass. In addition, the glass disclosed in Japanese Patent Application, First Publication No. 2006-182577 is an optical glass of a $B_2O_3$—ZnO—$La_2O_3$—$TeO_2$—$Nb_2O_5$ type containing 10 to 40 mol % of $TeO_2$ component, and has a low glass transition temperature, a high refractive index, and high transmittance. In addition, the glass disclosed in Japanese Patent Application, First Publication No. 2006-131450 contains an expensive $Ga_2O_3$ component as an essential component in order to achieve stability and a high refractive index of the glass.

The present invention provides a novel optical glass with a composition of $B_2O_3$—$TeO_2$—$La_2O_3$ type suitable for precision mold press forming, having superior resistance to devitrification, having optical constants (a refractive index, an Abbe number, and the like) required for aspherical lenses, and a low glass transition temperature.

The present inventors, as a result of extensive study and research to solve the abovementioned problems, have completed the present invention based on the findings that, by setting the content of $B_2O_3$ component and $TeO_2$ component to be in a predetermined range, an optical glass having optical constants within the above described specific range could be obtained even when lead is not contained, and a glass preform material suitable for the precision press molding could easily be obtained, because the glass has a low glass transition temperature that allows for precision press molding.

More specifically, the present invention provides that described as bellow.

In a first aspect, an optical glass contains no less than 5 mol % and no more than 60 mol % of a $B_2O_3$ component, and no less than 0.2 mol % and no more than 60 mol % of a $TeO_2$ component, by mol % on the basis of oxides.

In a second aspect, the optical glass according to the first aspect contains at least one selected from the group consisting of no more than 40 mol % of a $WO_3$ component, and a $La_2O_3$ component, by mol % on the basis of oxides.

In a third aspect, the optical glass according to the second aspect contains no less than 1 mol % and no more than 35 mol % of a $La_2O_3$ component, by mol % on the basis of oxides.

In a fourth aspect, the optical glass according to the first aspect contains at least one selected from the group consisting of no more than 25 mol % of a $Nb_2O_5$ component, and no more than 40 mol % of a ZnO component, by mol % on the basis of oxides.

In a fifth aspect, the optical glass according to the first aspect contains no more than 30 mol % of a $Bi_2O_3$ component, and no less than 0.2 mol % and no more than 60 mol % of a total content of a $TeO_2$ component and a $Bi_2O_3$ component, by mol % on the basis of oxides.

In a sixth aspect, the optical glass according to the first aspect contains less than 1 mol % of a $Ga_2O_3$ component, by mol % on the basis of oxides.

In a seventh aspect, the optical glass according to the first aspect contains no less than 30 mol % and no more than 60 mol % of a $B_2O_3$ component, and no less than 0.2 mol % and no more than 50 mol % of a $TeO_2$ component, by mol % on the basis of oxides.

In an eighth aspect, the optical glass according to the seventh aspect contains less than 1 mol % of a $WO_3$ component, by mol % on the basis of oxides.

In a ninth aspect, the optical glass according to the seventh aspect contains no more than 20 mol % of a $Bi_2O_3$ component, and no less than 0.2 mol % and no more than 50 mol % of a total content of a $TeO_2$ component and a $Bi_2O_3$ component, by mol % on the basis of oxides.

In a tenth aspect, the optical glass according to the first aspect contains no less than 25 mol % and no more than 60 mol % of a $B_2O_3$ component, and no less than 1 mol % and no more than 40 mol % of a $WO_3$ component, by mol % on the basis of oxides.

In an eleventh aspect, the optical glass according to the tenth aspect contains less than 5 mol % of a $Nb_2O_5$ component, by mol % on the basis of oxides.

In a twelfth aspect, the optical glass according to the tenth aspect contains no less than 1 mol % and no more than 40 mol % of a ZnO component, by mol % on the basis of oxides.

In a thirteenth aspect, the optical glass according to the first aspect contains no less than 5 mol % and no more than 55 mol % of a $B_2O_3$ component, and no less than 1 mol % and no more than 25 mol % of a $WO_3$ component, by mol % on the basis of oxides.

In a fourteenth aspect, the optical glass according to the thirteenth aspect contains less than 5 mol % of a ZnO component, by mol % on the basis of oxides.

In a fifteenth aspect, the optical glass according to the fourteenth aspect contains less than 1 mol % of a ZnO component, by mol % on the basis of oxides.

In a sixteenth aspect, the optical glass according to the thirteenth aspect contains substantially no ZnO component.

Here, the phrase "contains substantially no . . . " means that it is not contained artificially, except for the case it is contained as an impurity.

In a seventeenth aspect, the optical glass according to the tenth aspect contains no less than 1 mol % and no more than 25 mol % of a $Nb_2O_5$ component, by mol % on the basis of oxides.

In an eighteenth aspect, the optical glass according to the thirteenth aspect contains no less than 3 mol % and no more than 50 mol % of a $TeO_2$ component, by mol % on the basis of oxides.

In a nineteenth aspect, the optical glass according to the eighteenth aspect contains no less than 1 mol % and no more than 20 mol % of a $Bi_2O_3$ component, by mol % on the basis of oxides.

In a twentieth aspect, the optical glass according to the first aspect contains, by mol % on the basis of oxides, at least one of the components:

$Rn_2O$ (Rn represents at least one kind selected from the group consisting of Li, Na, K and Cs) is 0 mol % to 15 mol %;

RO (R represents at least one kind selected from the group consisting of Ba, Sr, Ca and Mg) is 0 mol % to 20 mol%;

$SiO_2$ is 0 mol % to 20 mol %;

$GeO_2$ is 0 mol % to 20 mol %;

$P_2O_5$ is 0 mol % to 10 mol %;

Total content of $Y_2O_3$, $Gd_2O_3$ and $Yb_2O_3$ is 0 mol % to 20 mol %;

$Ta_2O_5$ is 0 mol % to 10 mol %;

$ZrO_2$ is 0 mol % to 10 mol %;

$Al_2O_3$ is 0 mol % to 20 mol %;

$TiO_2$ is 0 mol % to 30 mol %;

Total content of $TiO_2$ and $Nb_2O_5$ is 0 mol % to 45 mol %; and

Total content of $Sb_2O_3$ and $As_2O_3$ is 0 mol % to 5 mol %.

In a twenty-first aspect, the optical glass according to the twentieth aspect contains no more than 10 mol % of an $Al_2O_3$ component, by mol % on the basis of oxides.

In a twenty-second aspect, the optical glass according to the twentieth aspect contains less than 1 mol % of a total content of a $TiO_2$ component and a $Nb_2O_5$ component, by mol % on the basis of oxides.

In a twenty-third aspect, the optical glass according to the twentieth aspect containing, by mol % on the basis of oxides, at least one of the components:

$Rn_2O$ in 0 mol % to 10%;

RO in 0 mol % to 10%;

Total content of $Y_2O_3$, $Gd_2O_3$ and $Yb_2O_3$ in 0 mol % to 10mol %;

$Al_2O_3$ in 0 mol % to 10%;

$TiO_2$ in 0 mol % to 15%;

Total content of a $TiO_2$ and $Nb_2O_5$ in less than 1 mol %.

In a twenty-fourth aspect, the optical glass according to the first aspect has a refractive index ($n_d$) of no less than 1.80 and no more than 2.20, and an Abbe number ($v_d$) of no less than 16 and no more than 40.

In a twenty fifth aspect, the optical glass according to the twenty-fourth aspect has a refractive index ($n_d$) of no less than 1.80 and no more than 2.10, and an Abbe number ($v_d$) of no less than 16 and no more than 36.

In a twenty-sixth aspect, the optical glass according to the twenty-fourth aspect has a refractive index ($n_d$) of no less than 1.80 and no more than 2.10, and an Abbe number ($v_d$) of no less than 18 and no more than 40.

In a twenty-seventh aspect, the optical glass according to twenty-fourth aspect has an Abbe number ($v_d$) of no less than 18 and no more than 36.

In a twenty-eighth aspect, the optical glass according to the first aspect has a glass transition temperature (Tg) of no more than 680° C.

In a twenty-ninth aspect, the optical glass according to the twenty-eighth aspect has a glass transition temperature (Tg) of no more than 650° C.

According to a thirtieth aspect, in the optical glass according to the first aspect, the wavelength showing 70% transmittance is no more than 550 nm in a glass of 10 mm in the thickness.

According to a thirty-first aspect, in the optical glass according to the thirtieth aspect, the wavelength showing 70% transmittance is no more than 550 nm in a glass of 10 mm in the thickness.

In a thirty-second aspect, a preform for the precision press molding consists of an optical glass according to the first aspect.

In a thirty-third aspect, an optical element consists of an optical glass according to the first aspect.

The present invention can provide an optical glass having optical constants with a refractive index ($n_d$) of no less than 1.80 and no more than 2.20, and an Abbe number ($v_d$) of no less than 16 and no more than 40. Furthermore, since the optical glass has a glass transition temperature (Tg) of no more than 680° C., it is suitable for a glass preform material and precision press molding. In addition, the optical glass has high stability and resistance to devitrification, and has high transmittance in the visible region, and satisfies the requirement for the optical design in recent years, thereby being industrially very useful.

DETAILED DESCRIPTION OF THE INVENTION

The optical glass of the present invention contains no less than 5 mol % and no more than 60 mol % of $B_2O_3$ component and no less than 0.2 mol % and no more than 60 mol % of $TeO_2$ component. Addition of a $B_2O_3$ component as the essential component in the above range can increase the resistance to devitrification and the viscosity at the temperature of the liquid phase. In addition, use of the $TeO_2$ component in combination as the essential component in the above range can decrease the glass transition temperature and increase the refractive index. Therefore, it is possible to obtain an optical glass that has superior stability and resistance to devitrification, and has a refractive index ($n_d$) of no less than 1.80 and no more than 2.20, an Abbe number ($v_d$) of no less than 16 and no more than 40, and a glass transition temperature (Tg) of no more than 680° C.

The embodiment of the optical glass according to the present invention is described in detail below; however, the invention is not limited in any way by the embodiments described below, and the invention can be carried out with modifications as appropriate within the object of the invention. Here, an explanation is optionally omitted to overlapping descriptions; however, it does not limit the aim of the invention.

Glass Components

The range of the composition for each component constituting the optical glass of the invention is described below. Herein, the content of each component is represented in mol % on the basis of oxides, unless otherwise stated. Here, "on the basis of oxides" means that each component contained in the glass is represented by taking a total content of mass of the generated oxide as 100 mol %, assuming that all oxides, nitrates, and the like used as raw materials for the components constituting the glass of the invention are decomposed and changed to oxides at the time of melting. Essential component and optional component In the optical glass of the above described present invention, the $B_2O_3$ component is an essential component as a glass forming oxide that improves devitrification of the glass and increases viscosity at a temperature of the liquid phase. However, if the content is too small, the resistance to devitrification is liable to decrease, and if too large, the refractive index and chemical durability such as water durability are liable to decrease. Therefore, the content of the $B_2O_3$ component is preferably 5%, more preferably 10%, and most preferably 15% as the lower limit, and preferably 60%, more preferably 55%, and most preferably 50% as the upper limit, on the basis of oxides. Here, the content of the $B_2O_3$ component causes no techical disadvantage so long as it is within the range; however, when the resistance to devitrification is taken into consideration, it is preferably 25%, more preferably 30%, and most preferably 32% as the lower limit.

The $TeO_2$ component is an essential component that decreases the glass transition temperature and increases the refractive index. However, if the content is too large, the glass is liable to be black in color and the stability and chemical durability of the glass is liable to decrease. Furthermore, since the thermal expansion coefficient of the glass increases, the glass is liable to crack, and when the glass is melted in a crucible made of platinum, the glass solution is liable to erode platinum. As a result, there is concern over whether a hole is formed in the vessel, and the risk of accidents caused by the molten glass flowing out from the hole. On the contrary, if the content is too small, it is difficult to get the above described effect. Therefore, the content of the $TeO_2$ component is preferably 0.2%, more preferably 1.0%, and most preferably 3.0% as the lower limit, and preferably 60.0%, more preferably 50.0%, and most preferably less than 45.0% as the upper limit, on the basis of oxides.

The $WO_3$ component is an optional component that improves the stability of the glass, increases a refractive index, contributes to the dispersion, and decreases a glass transition temperature; however, if the content is too large, the phase separation of the glass tends to increase. Therefore, the content of the $WO_3$ component is preferably 40%, more preferably 30%, and most preferably 25% as the upper limit, on the basis of oxides. Here, the content of the $WO_3$ component causes no technical disadvantage so long as it is in the range; however, when the above described effect is to be obtained easily, it is preferably 1%, more preferably 3%, and most preferably 5% as the lower limit. On the other hand, when the specific gravity of the glass and the material cost of the glass are to be decreased or the coloring of the glass caused by the reduction of the $WO_3$ component is taken into consideration, the content of the $WO_3$ component is preferably less than 1%, and most preferably 0%.

The $La_2O_3$ component is a component that contributes to the improvement of the stability of the glass, increases the refractive index, enhances the dispersion, and is an optional component effective in increasing the precision press molding property. However, if the content is too large, the resistance to devitrification is liable to deteriorate rapidly. Therefore, the content of the $La_2O_3$ component in order to obtain the desired optical constants and favorable resistance to devitrification, while maintaining the stability of the glass is preferably 35%, more preferably 30%, and most preferably 25% as the upper limit, on the basis of oxides. Here, the content of the $La_2O_3$ component causes no technical disadvantage so long as it is within the range; however, when the above described effect is to be obtained easily, it is preferably 1%, more preferably 3%, and most preferably 5% as the lower limit.

The $Nb_2O_5$ component is an optional component that increases the refractive index, contributes to the high dispersion, and improves the devitrification of the glass. However, if the content thereof is too large, the melting properties of the glass are liable to deteriorate. Therefore, the content of the $Nb_2O_5$ component is preferably 30%, more preferably 25%, and most preferably 20% as the upper limit, on the basis of oxides. Here, the content of the $Nb_2O_5$ component causes no technical disadvantage so long as it is within the range; however, when the above described effect is to be obtained easily, it is preferably 1%, more preferably 3%, and most preferably 5% as the lower limit. On the other hand, when the melting properties of the glass are taken into consideration, the content of the $Nb_2O_5$ component is preferably less than 5%, more preferably less than 1%, and most preferably not contained, on the basis of oxides.

The ZnO component is an optional component that improves the stability of the glass, and further decreases the glass transition temperature; however, if the content is too large, it becomes difficult to maintain the target refractive index, and the resistance to devitrification is liable to deteriorate. Therefore, in order to decrease the glass transition temperature while maintaining a favorable resistance to devitrification, the content of the ZnO component is preferably 40.0%, more preferably 35.0%, and most preferably 30.0% as the upper limit, on the basis of oxides. Here, the content of the ZnO component causes no technical disadvantage so long as it is in the range; however, when the above described effect is to be obtained easily, it is preferably 1.0%, more preferably 3.0%, and most preferably 6.0% as the lower limit. On the other hand, when the refractive index and the resistance to devitrification are taken into consideration, the content of the ZnO component is preferably less than 5.0%, more preferably less than 3.5%, and most preferably not contained, on the basis of oxides.

The $Bi_2O_3$ component is an optional component that improves the stability of the glass, achieves the high refractive index and high dispersion, and has an effect to decrease the glass transition temperature. However, if the content is too small, it is difficult to obtain the desired effect, and if too large, the stability of the glass is liable to deteriorate, and cause devitrification. Therefore, the content of the $Bi_2O_3$ component is preferably 30%, more preferably 20%, and most preferably 15% as the upper limit, on the basis of oxides. Here, the content of the $Bi_2O_3$ component causes no techical disadvantage so long as it is in the range; however, when the above described effect is to be obtained easily, it is preferably 1%, more preferably 2%, and most preferably 3% as the lower limit.

In addition, since the $Bi_2O_3$ component works similarly to the $TeO_2$ component, it is preferable to introduce the $Bi_2O_3$ component as a substitute for the $TeO_2$ component. In order to obtain a glass having a high stability, total content of the $Bi_2O_3$ component and the $TeO_2$ component is preferably 0.2%, more preferably 3.0%, and most preferably 5.0% as the lower limit, and preferably 60.0%, more preferably 50.0%, and most preferably 45.0% as the upper limit, on the basis of oxides.

The $Ga_2O_3$ component is a component that improves the refractive index; however, it is expensive, and liable to significantly deteriorate the stability. Therefore, the content of the $Ga_2O_3$ component is preferably less than 1% as the upper limit, and more preferably not contained, on the basis of oxides.

The $Rn_2O$ component, in which Rn represents one or more elements selected from Li, Na, K and Cs, is an optional component that significantly decreases the glass transition temperature, and has an effect to enhance the melting of the mixed raw materials of the glass. However, if the content is too large, the resistance to devitrification is liable to deteriorate rapidly. Therefore, in order to maintain a favorable glass transition temperature and resistance to devitrification, the content of the $Rn_2O$ component is preferably 15%, more preferably 10%, and most preferably 8% as the upper limit, on the basis of oxides.

The RO component, in which R represents one or more elements selected from the group consisting of Ba, Ca, Mg and Sr, is an optional component that decreases the glass transition temperature and has an effect to improve the melting properties, the resistance to devitrification and the chemical durability of the glass. However, if the content is too large, the stability of the glass is liable to deteriorate rapidly. Therefore, in order to make it easy to maintain the stability of the glass, the content of the RO component is preferably 20%, more preferably 15%, and most preferably 10% as the upper limit, on the basis of oxides.

The $SiO_2$ component is an optional component that constitutes the skeleton of the glass, improves the resistance to devitrification and chemical durability and has an effect to widen the operational range. However, if the content is too large, the refractive index is liable to decrease, and the stability of the glass is liable to decrease. Therefore, the content of the $SiO_2$ component is preferably 20%, more preferably 15%, and most preferably 10% as the upper limit, on the basis of oxides.

The $GeO_2$ component is an optional component that improves the stability and the refractive index of the glass and has an effect to contribute to the high dispersion of the glass, and it is more preferable to introduce it in the glass as a substitute for a portion of the $B_2O_3$ component. However, if the content is too large, since the $GeO_2$ component is expensive, the material cost of the glass will increase, and it becomes difficult to maintain the glass transition temperature no less than 500° C. and no more than 700° C. Therefore, the content of the $GeO_2$ component is preferably 20%, more preferably 15%, and most preferably 10% as the upper limit, on the basis of oxides.

The $P_2O_5$ component is an optional component that has an effect to improve the stability and decrease the glass transition temperature. However, if the content is too large, the phase separation of the glass is liable to increase. Therefore, the content of the $P_2O_5$ component is preferably 10%, more preferably 8%, and most preferably 5% as the upper limit, on the basis of oxides.

The $Y_2O_3$ component, the $Gd_2O_3$ component, and/or the $Yb_2O_3$ component are optional components that have an effect to adjust the dispersion by increasing the refractive index of the glass. However, if the content is too large, the resistance to devitrification is liable to deteriorate rapidly. Therefore, in order to make it easy to maintain a favorable resistance to devitrification, while maintaining the desired optical constants, total content of the $Y_2O_3$ component, $Gd_2O_3$ component, and/or the $Yb_2O_3$ component is preferably 20%, more preferably 15%, and most preferably 10% as the upper limit, on the basis of oxides.

The $Ta_2O_5$ component is an optional component that increases the refractive index of the glass, adjusts the dispersion of the glass, and has an effect to improve the chemical durability. However, if the content is too large, the stability of the glass is liable to decrease, and the glass transition temperature is liable to increase. Therefore, in order to make it easy to maintain a favorable chemical durability and stability, while maintaining the desired optical constants, the content of the $Ta_2O_5$ component is preferably 10%, more preferably 8%, and most preferably 5% as the upper limit, on the basis of oxides.

The $ZrO_2$ component is an optional component that increases the refractive index of the glass, and has an effect to improve the chemical durability. However, if the content is too large, the stability of the glass is liable to decrease. Therefore, the content of the $ZrO_2$ component is preferably 10%, more preferably 8%, and most preferably 5% as the upper limit, on the basis of oxides.

The $Al_2O_3$ component is an optional component that improves the chemical durability of the glass, and is effective to improve the mechanical strength. However, if the content is too large, the melting properties of the glass become poor, devitrification is liable to increase, and the glass transition temperature is liable to increase. Therefore, the content of the $Al_2O_3$ component is preferably 20%, more preferably 10%, and most preferably 5% as the upper limit, on the basis of oxides.

The $TiO_2$ component is an optional component that increases the refractive index of the glass, contributes to the high dispersion and is effective to decrease the temperature of the liquid phase. However, if the content is too large, devitrification tends to increase on the contrary. Therefore, the content of the $TiO_2$ component is preferably 30%, more preferably 20%, and most preferably 15% as the upper limit, on the basis of oxides.

The $TiO_2$ component and/or the $Nb_2O_5$ component are optional components that increase the refractive index of the glass, contribute to the high dispersion, and are effective to improve devitrification and the chemical durability of the glass. However, if the content is too large, the melting property and the stability of the glass tend to be liable to deteriorate. Therefore, a total content of the $TiO_2$ component and/or the $Nb_2O_5$ component is preferably 45%, more preferably 35%, and most preferably 30% as the upper limit, on the basis of oxides. Here, a total content of the $TiO_2$ component and/or the $Nb_2O_5$ component causes no technical disadvantage so long as it is within the range; however, when the melting properties and the stability are taken into consideration, it is preferably less than 1%. The object of the present invention can be achieved by introducing either of these two components alone to the glass; however, since the $Nb_2O_5$ component is more effective, it is preferable to introduce the $Nb_2O_5$ component.

The $Sb_2O_3$ component and/or the $As_2O_3$ component are optional components added to remove foams in the molten glass; however, no more than 5% for a total content of the $Sb_2O_3$ component and/or the $As_2O_3$ component is enough. Particularly, for the $As_2O_3$ component, environmental counter measures are required to be taken at the time of manufacturing, processing and disposal of the glass, and therefore the component is preferably not contained.

Components that Should Not be Contained

Next, the components that should not be contained in the optical glass of the present invention are described.

For a lead component, there is a problem in that it easily adheres to the die at the time of the precision press molding, and environmental counter measures are required not only for the manufacturing of the glass, but also for the process from cold processing through disposal of the glass. Thus, due to the problem of the component having a large environmental burden, the optical glass of the present invention preferably does not contain the component.

A cadmium component and a thorium component are components that adversely affect the environment and have a large environmental burden, and therefore they should not be contained in the optical glass of the present invention.

In addition, the coloring components such as V, Cr, Mn, Fe, Co, Ni, Cu, Mo, Eu, Nd, Sm, Tb, Dy, Er and the like are liable to deteriorate the desired characteristics as an optical glass, and therefore are preferably not contained in the optical glass of the present invention. However, the phrase "not contained" used herein means not contained artificially, except for a case where contained as an impurity.

Physical Properties

Next, the physical properties of the optical glass of the invention are described.

The optical glass of the present invention requires having an appropriate refractive index and dispersion. Here, the refractive index of the optical glass ($n_d$) is preferably 1.80, more preferably 1.81, and most preferably 1.82 as the lower limit, and preferably 2.20, more preferably 2.15, and most preferably 2.10 as the upper limit. In addition, an Abbe number ($v_d$) of the optical glass is preferably 16, more preferably 18, and most preferably 19 as the lower limit, and preferably 40, more preferably 38, and most preferably 36 as the upper limit. In this way, when the optical element is made using the optical glass of the present invention, an appropriate refractive amount of light and the desired chromatic aberration can be obtained as well, which results in a reduction of the number of the optical elements to be used, thereby realizing a lightweight and compact device using the optical element.

The optical glass of the present invention is used in an application in which the optical constants are required to be within the ranges described above, and may also be used as a glass preform material which is softened by further heating and then subjected to precision press molding to obtain the glass mold product. Therefore, in order to suppress the damage and deterioration of the die used in the precision press molding, to maintain the highly precision mold face for a long period of time, and to allow the precision press molding at a low temperature, the glass is required to have as low a glass transition temperature as possible. In the optical glass with a composition of the specific range described above, the desired glass transition temperature is realized.

Preferably, the optical glass of the invention has a glass transition temperature of no more than 680° C. As a result, the precision press molding can be performed at a relatively low temperature, and then it is possible to reduce damage of the mold used for the precision press molding caused by a high temperature environment of the press molding, and to reduce damage of the parting film provided on the inside surface of the mold. Here, the upper limit of the glass transition temperature is preferably 680° C., more preferably 650° C., and most preferably 620° C. If the glass transition temperature is too high, the molding properties in the mold press forming are liable to deteriorate. On the other hand, the lower limit of the glass transition temperature is preferably 450° C., more preferably 470° C., and most preferably 480° C. If the glass transition temperature is too low, the chemical durability is liable to deteriorate, and simultaneously the resistance to devitrification is liable to decrease, resulting in the stable production being liable to become difficult.

In the optical glass of the present invention, when the mold press forming is carried out, the upper limit temperature of the mold pressing correlates with the glass yield point (Ts) in addition to the glass transition temperature. The lower the temperature of the glass yield point is, the more progress of the surface oxidation of the die is prevented, and thus it is also preferable from the view point of the life of the die. Therefore, the yield point of the glass of the optical glass is preferably 720° C., more preferably 690° C., and most preferably 660° C. as the upper limit. Here, the glass yield point of the glass is a temperature at which the glass stops elongation and starts to shrink when the temperature of the glass is raised. In the present invention, the glass yield point was determined using a thermal expansion measurement instrument at a raising rate of the temperature of 8° C./min.

As described above, the optical glass of the present invention can be used as a glass preform material for press molding, or the molten glass can be subjected to direct pressing. When the optical glass is used as a glass preform material, the manufacturing method and the hot molding method are not particularly limited, and a publicly known manufacturing method and molding method can be used. The glass preform material can be manufactured directly from the molten glass using the molding method disclosed, for example, in Japanese Patent Application, First Publication No. 1996-319124, and using the manufacturing method and instrument disclosed in Japanese Patent Application, First Publication No. 1996-73229. In addition, the glass preform material may be manufactured by the cold processing of a strip material.

The hot molding method of the glass preform material is not limited; however, for example, the molding method of the optical element disclosed in Japanese Patent Publication No. 1987-41180 can be used. The optical element may be produced either by pressing the glass preform material that is produced from the optical glass of the present invention, or by direct pressing of the molten and softened optical glass without using the glass preform material. Here, as the optical element, for example, various kinds of lenses can be mentioned such as convex/convex, concave/concave, flat/convex, flat/concave, meniscus and the like, mirror, prism, diffraction grating, and the like.

The optical glass of the present invention can provide a wavelength of no longer than 550 nm having transmittance of 70% ($\lambda_{70\%}$) in a glass of 10 mm in thickness. The light transmittance rate yield is in a high transmittance in the visible region. Therefore, a wide application to lenses of compact cameras and the like is expected. The wave length ($\lambda_{70\%}$) is preferably no longer than 510 nm, and most preferably no longer than 500 nm.

Manufacturing Method

The manufacturing method of the optical glass of the present invention is not particularly limited as long as it is a conventional method to manufacture optical glasses. For examples, the optical glass can be manufactured by the following method.

A predetermined amount of each starting raw material (oxide, carbonate, nitrate, phosphate, sulfate, fluoride salt, etc.) was weighted and then mixed uniformly. After the mixed raw material was poured into a quartz crucible or an alumina crucible and roughly melted, the melted material was poured into a gold crucible, a platinum crucible, a platinum alloy crucible, or an iridium crucible and melted at temperatures from 850 to 1,300° C. for 1 to 10 hours in a melting furnace. Subsequently, after stirring the melted material to homogeneity, cooling it to a proper temperature, casting it in a mold or the like, the glass was manufactured.

Next, the obtained plate-like glass was cut to a predetermined size, forming a substantially cubic work piece. The glass was poured into a polishing machine, manufacturing a polished ball through polishing. More specifically, the glass is cut into a substantially cube shape, a barreling process is performed, and sharp edges of the substantially cube shape are removed. Subsequently, a polished ball is manufactured by pouring the glass into an Oscar type polishing machine, and then a rough rounding process, a finishing rounding process, and a polishing process are performed.

The optical glass of the present invention having the optical constants (refractive indices, Abbe's numbers, etc.) demanded by aspherical lenses and the like, can be used typically for purposes of lenses, prisms, mirrors, and other optical devices. Furthermore, the optical devices of the present invention having superior devitrification resistance and a low glass transition temperature are also preferable for dropping a molten glass from a flow-outlet of a flow-out pipe made of materials such as platinum and forming a globular preform for precision press molding. Moreover, since the preform for precision press molding can be easily used for precision press molding, an optical device of a desired shape can be manufactured by performing a method of precision press molding.

EXAMPLES

Hereinafter, the present invention is explained with reference to embodiments; however, the following embodiments only serve as examples and should not be construed as limiting to the invention in any way.

Examples 1 to 45

In regards to Examples 1 to 45 of the optical glasses according to the present invention, Tables 1 to 6 show together with a composition of the glass, a refractive index ($n_d$), an Abbe's number ($v_d$), a glass transition temperature (Tg), a glass yield point temperature (Ts), and a wavelength ($\lambda_{70\%}$) that exhibits a transmissivity of 70% in a glass having a thickness of 10 mm. Mixed raw materials are prepared by using conventional raw materials of optical glasses such as oxides, hydroxides, carbonates, nitrates, fluorides, and the like corresponding to the raw materials of each component respectively, weighing and mixing at a rate of the composition of each Example. The optical glasses are obtained by pouring the raw materials into a platinum crucible, melting, clarifying, and stirring to homogeneity at temperatures from 1,000 to 1,250° C. for 3 to 5 hours depending on the melting properties of the compositions, casting thereof into a mold or the like, and cooling slowly. Furthermore, the composition of each component was expressed by mol %.

The refractive indices and the Abbe's numbers were measured according to JOGIS01-2003 for the glasses obtained by maintaining at a temperature near the glass transition temperature for 2 hours, and then lowering the temperature slowly at a rate of −25° C./Hr.

The glass transition temperature and the glass yield point temperature were measured according to the method described in Japan Optical Glass Industrial Standard JOGIS08-2003 "Measuring Method of Thermal Expansion of Optical Glass" (measured by a thermal dilatometer when the rate of temperature increase was set at 8° C./min). In this regard, samples of 50 mm in length and 4 mm in diameter were used.

The refractive indices were measured according to Japan Optical Glass Industrial Standard JOGIS02. Furthermore, not degrees of pigmentation, but rather wavelengths ($\lambda_{70\%}$) exhibit a transmissivity of 70% in glasses having a thickness of 10 mm were shown by the present invention. In particular, according to JISZ8722, by measuring the spectral transmittances at 200 to 800 nm for samples having a thickness of 10±0.1 mm and polished opposing parallel surfaces, wavelengths ($\lambda_{70\%}$) exhibiting a transmissivity of 70% were obtained.

Comparative Examples 1 and 2

Furthermore, in regards to the composition of Comparative Examples 1 and 2, glasses were obtained by the same methods as for the aforementioned Examples; however, both of the glasses were devitrified and could not be used as optical glass.

TABLE 1

| | Example | | | | | | | |
|---|---|---|---|---|---|---|---|---|
| | 1 | 2 | 3 | 4 | 5 | 6 | 7 | 8 |
| $B_2O_3$ | 40 | 35 | 40 | 40 | 40 | 35 | 41 | 45 |
| $GeO_2$ | | | | | | | | |
| $P_2O_5$ | | | | | | | | |
| ZnO | 17 | 15 | 12 | 12 | 10 | 10 | 14 | 15 |
| BaO | | | | | | | | |
| $Li_2O$ | | | | | | | | |
| $TiO_2$ | | | | | 10 | | | |
| $La_2O_3$ | 15 | 15 | 15 | 20 | 15 | 15 | 16 | 20 |
| $SiO_2$ | | | | | | | | |
| $TeO_2$ | 18 | 25 | 18 | 18 | 15 | 25 | 18 | 10 |
| $Bi_2O_3$ | | | | | | 5 | 2 | |
| $WO_3$ | | | | | | | | |
| $Nb_2O_5$ | 10 | 10 | 15 | 10 | 10 | 10 | 9 | 10 |
| $Ga_2O_3$ | | | | | | | | |
| $Yb_2O_3$ | | | | | | | | |
| $Ta_2O_5$ | | | | | | | | |
| $ZrO_2$ | | | | | | | | |
| $Al_2O_3$ | | | | | | | | |
| $Sb_2O_3$ | | | | | | | | |
| $n_d$ | 1.893 | 1.916 | 1.929 | 1.904 | 1.929 | 1.964 | 1.904 | 1.879 |
| $v_d$ | 31.0 | 29.4 | 28.3 | 31.9 | 27.7 | 26.1 | 30.2 | 34.4 |
| Tg(° C.) | 577 | 560 | 582 | 598 | 593 | 544 | 561 | 605 |
| Ts(° C.) | 624 | 603 | 620 | 640 | 631 | 590 | 609 | 650 |
| $\lambda_{70\%}$ (Thickness 10 mm) | 410 | 420 | 420 | 410 | 440 | 450 | 417 | 400 |

TABLE 2

| | Example | | | | | | | | |
|---|---|---|---|---|---|---|---|---|---|
| | 9 | 10 | 11 | 12 | 13 | 14 | 15 | 16 | 17 |
| $B_2O_3$ | 43 | 43 | 43 | 43 | 44 | 43 | 43 | 43 | 35 |
| $GeO_2$ | | | | | | | | | |
| $P_2O_5$ | | | | | | | | | |
| ZnO | 14 | 18 | 11 | 15 | 14 | 18 | 15 | 14 | 10 |
| BaO | | | | | | | 3 | | |
| $Li_2O$ | | | 3 | 3 | | | | | |
| $TiO_2$ | | | | | | | | | |
| $La_2O_3$ | 17 | 16 | 17 | 16 | 16 | 16 | 16 | 17 | 15 |
| $SiO_2$ | | | | | | | | | |
| $TeO_2$ | 15 | 12 | 15 | 12 | 15 | 9 | 9 | 14 | 20 |
| $Bi_2O_3$ | 3 | 5 | 3 | 5 | 5 | 5 | 5 | 4 | 10 |
| $WO_3$ | | | | | | | | | |
| $Nb_2O_5$ | 8 | 6 | 8 | 6 | 6 | 6 | 6 | 6.5 | 10 |
| $Ga_2O_3$ | | | | | | | | | |
| $Yb_2O_3$ | | | | | | | | | |
| $Ta_2O_5$ | | | | | | | | | |
| $ZrO_2$ | | | | | | 3 | | 1.4 | |
| $Al_2O_3$ | | | | | | | | | |
| $Sb_2O_3$ | | | | | | | | 0.1 | |
| $n_d$ | 1.892 | 1.896 | 1.893 | 1.890 | 1.899 | 1.900 | 1.894 | 1.900 | 2.054 |
| $v_d$ | 30.9 | 30.7 | 31.1 | 31.1 | 30.3 | 31.1 | 31.4 | 31.0 | 23.5 |
| Tg(° C.) | 573 | 557 | 537 | 546 | 560 | 565 | 566 | 571 | 555 |
| Ts(° C.) | 606 | 592 | 568 | 577 | 597 | 600 | 599 | 603 | 586 |
| $\lambda_{70\%}$ (Thickness 10 mm) | 417 | 423 | 420 | 422 | 424 | 423 | 422 | 422 | 480 |

TABLE 3

| | Example | | | | |
|---|---|---|---|---|---|
| | 18 | 19 | 20 | 21 | 22 |
| $B_2O_3$ | 45 | 40 | 45 | 35 | 35 |
| $GeO_2$ | | | 2 | | |
| $P_2O_5$ | | | | | |
| ZnO | 15 | 14 | 15 | 5 | |
| BaO | | | | | |
| $Li_2O$ | | | | | |
| $TiO_2$ | | | | | |
| $La_2O_3$ | 15 | 17 | 15 | 15 | 15 |
| $SiO_2$ | | | | 1 | |
| $TeO_2$ | 10 | 18 | 10 | 25 | 30 |

TABLE 3-continued

| | Example | | | | |
|---|---|---|---|---|---|
| | 18 | 19 | 20 | 21 | 22 |
| Bi$_2$O$_3$ | | | | 10 | 10 |
| WO$_3$ | | | | | |
| Nb$_2$O$_5$ | 15 | 11 | 9.5 | 10 | 10 |
| Ga$_2$O$_3$ | | | | | |
| Yb$_2$O$_3$ | | | | | |
| Ta$_2$O$_5$ | | | 0.5 | | |
| ZrO$_2$ | | | | | |
| Al$_2$O$_3$ | | | 2 | | |
| Sb$_2$O$_3$ | | | | | |
| n$_d$ | 1.902 | 1.904 | 1.853 | 2.018 | 2.021 |
| ν$_d$ | 30.1 | 31.0 | 35.5 | 22.8 | 22.1 |
| Tg(° C.) | 588 | 580 | 595 | 538 | 533 |
| Ts(° C.) | 632 | 619 | 630 | 572 | 568 |
| λ$_{70\%}$ (Thickness 10 mm) | 420 | 410 | 400 | 475 | 475 |

TABLE 4

| | Example | | | | | | | | | |
|---|---|---|---|---|---|---|---|---|---|---|
| | 23 | 24 | 25 | 26 | 27 | 28 | 29 | 30 | 31 | 32 |
| B$_2$O$_3$ | 43 | 40 | 40 | 38 | 40 | 43 | 40 | 40 | 30 | 38 |
| GeO$_2$ | | | | | | | | | | 1.5 |
| P$_2$O$_5$ | | | | | | | | | | 0.5 |
| ZnO | 24 | 23 | 13 | 10 | 13 | 24 | | | | 22.4 |
| BaO | | | | 2 | | | | | | |
| Li$_2$O | 4 | | | 1 | | | | | | |
| TiO$_2$ | | | | | | | | | | 0.5 |
| La$_2$O$_3$ | 15 | 15 | 15 | 15 | 15 | 15 | 20 | 15 | 15 | 15 |
| SiO$_2$ | | | | 2 | | | | | | |
| TeO$_2$ | 7 | 18 | 24 | 21 | 18 | 7 | 30 | 20 | 30 | 18 |
| Bi$_2$O$_3$ | | | | | | 3 | | 10 | 10 | |
| WO$_3$ | 4 | 4 | 8 | 8 | 14 | 8 | 10 | 15 | 15 | 4 |
| Nb$_2$O$_5$ | 0.5 | | | | | | | | | |
| Ga$_2$O$_3$ | | | | | | | | | | |
| Yb$_2$O$_3$ | | | | | | | | | | |
| Ta$_2$O$_5$ | 2.5 | | | | | | | | | |
| ZrO$_2$ | | | | 3 | | | | | | |
| Al$_2$O$_3$ | | | | | | | | | | |
| Sb$_2$O$_3$ | | | | | | | | | | 0.1 |
| n$_d$ | 1.812 | 1.818 | 1.829 | 1.830 | 1.834 | 1.844 | 1.868 | 1.954 | 1.998 | 1.821 |
| ν$_d$ | 39.8 | 37.3 | 35.8 | 36.3 | 35.4 | 34.3 | 33.0 | 25.5 | 23.4 | 37.5 |
| Tg(° C.) | 539 | 560 | 556 | 552 | 572 | 554 | 586 | 528 | 518 | 563 |
| Ts(° C.) | 565 | 600 | 592 | 589 | 611 | 586 | 618 | 558 | 550 | 604 |
| λ$_{70\%}$ (Thickness 10 mm) | 390 | 390 | 410 | 410 | 420 | 420 | 420 | 470 | 480 | 390 |

TABLE 5

| | Example | | | | | | | |
|---|---|---|---|---|---|---|---|---|
| | 33 | 34 | 35 | 36 | 37 | 38 | 39 | 40 |
| B$_2$O$_3$ | 40 | 40 | 40 | 35 | 30 | 30 | 25 | 35 |
| GeO$_2$ | | | | | | | | |
| P$_2$O$_5$ | | | | | | | | |
| ZnO | | | | 4 | | | | |
| BaO | | | | | | | | 2 |
| Li$_2$O | | | | | | | | 2 |
| TiO$_2$ | | | | | | | | |
| La$_2$O$_3$ | 20 | 20 | 20 | 15 | 15 | 15 | 10 | 15 |
| SiO$_2$ | | | | | | | | |
| TeO$_2$ | 15 | 20 | 20 | 20 | 30 | 25 | 35 | 20 |
| Bi$_2$O$_3$ | | | | 10 | 10 | 10 | 10 | 10 |
| WO$_3$ | 10 | 10 | 15 | 6 | 10 | 10 | 10 | 6 |
| Nb$_2$O$_5$ | 15 | 10 | 5 | 10 | 5 | 10 | 10 | 10 |
| Ga$_2$O$_3$ | | | | | | | | |
| Yb$_2$O$_3$ | | | | | | | | |
| Ta$_2$O$_5$ | | | | | | | | |
| ZrO$_2$ | | | | | | | | |
| Al$_2$O$_3$ | | | | | | | | |
| Sb$_2$O$_3$ | | | | | | | | |
| n$_d$ | 1.947 | 1.922 | 1.901 | 2.015 | 2.019 | 2.044 | 2.074 | 1.985 |
| ν$_d$ | 27.9 | 29.3 | 30.7 | 23.3 | 22.8 | 22.1 | 20.3 | 23.6 |
| Tg(° C.) | 603 | 598 | 604 | 540 | 516 | 534 | 494 | 535 |
| Ts(° C.) | 635 | 638 | 640 | 575 | 554 | 562 | 528 | 569 |

TABLE 5-continued

| | Example | | | | | | |
|---|---|---|---|---|---|---|---|
| | 33 | 34 | 35 | 36 | 37 | 38 | 39 | 40 |
| $\lambda_{70\%}$ (Thickness 10 mm) | 440 | 430 | 440 | 475 | 480 | 490 | 500 | 475 |

TABLE 6

| | Example | | | | | | | Comparative Example | |
|---|---|---|---|---|---|---|---|---|---|
| | 41 | 42 | 43 | 44 | 45 | 46 | 47 | 1 | 2 |
| $B_2O_3$ | 32 | 28 | 25 | 20 | 30 | 30 | 40 | 40 | 40 |
| $GeO_2$ | | 1 | | | | | | | |
| $P_2O_5$ | | 1 | | | | | | | |
| ZnO | 4 | 2 | | | | | 0.5 | 16 | 13 |
| BaO | | | | | | | | | |
| $Li_2O$ | | | | | | | | | |
| $TiO_2$ | 3 | | | | | | | | |
| $La_2O_3$ | 15 | 15 | 15 | 10 | 15 | 20 | 15 | 17.5 | 20 |
| $SiO_2$ | 3 | | | | | | | | |
| $TeO_2$ | 17 | 25 | 30 | 40 | 25 | 25 | 20 | 10 | 10 |
| $Bi_2O_3$ | 10 | 10 | 10 | 10 | 5 | 5 | 10 | 3 | |
| $WO_3$ | 6 | 10 | 10 | 10 | 10 | 10 | 4.4 | 3 | |
| $Nb_2O_5$ | 7 | 5 | 10 | 10 | 15 | 10 | 10 | 8.5 | 12 |
| $Ga_2O_3$ | | | | | | | | 2 | 5 |
| $Yb_2O_3$ | | | | | | | | | |
| $Ta_2O_5$ | | 3 | | | | | | | |
| $ZrO_2$ | 3 | | | | | | | | |
| $Al_2O_3$ | | | | | | | | | |
| $Sb_2O_3$ | | | | | | | 0.1 | | |
| $n_d$ | 2.010 | 2.023 | 2.065 | 2.097 | 2.031 | 2.002 | 1.993 | Devitrified, physical properties cannot be measured. | Devitrified, physical properties cannot be measured. |
| $v_d$ | 24.5 | 24.0 | 21.5 | 19.7 | 22.8 | 25.1 | 24.4 | | |
| Tg (° C.) | 547 | 536 | 528 | 488 | 551 | 563 | 542 | | |
| Ts (° C.) | 583 | 563 | 557 | 518 | 585 | 596 | 579 | | |
| $\lambda_{70\%}$ (Thickness 10 mm) | 475 | 480 | 490 | 510 | 475 | 460 | 470 | | |

As shown in Tables 1 to 6, it is confirmed that all the optical glasses of the Examples (Example 1 to Example 45) having optical constants within a certain range, that is, refractive indices ($n_d$) of no less than 1.80 and no more than 2.20, Abbe's numbers ($v_d$) of no less than 16 and no more than 40, glass transition temperatures (Tg) of no more than 680° C., glass yield point temperatures (Ts) of no more than 720° C., are able to be used as preforms for precision press-molding and precision press-molding. In addition, it is confirmed that the wavelengths ($\lambda_{70\%}$) exhibit a transmissivity of 70% in glasses which have a thickness of 10 mm is no more than 550 nm, which having a superior transitivity of light in visible region.

What is claimed is:

1. An optical glass comprising 5 mol % to 60 mol % of a $B_2O_3$ component, 16 mol % to 35 mol % of a $La_2O_3$ component, 0.2 mol % to 60 mol % of a $TeO_2$ component, and 1 mol % to 40 mol % of a $WO_3$ component, by mol % on the basis of oxides, wherein the optical glass does not contain a lead component, the optical glass has a refractive index ($n_d$) of 1.80 to 2.20, and the optical glass has an Abbe number ($v_d$) of 16 to 34.4.

2. The optical glass according to claim 1, comprising at least one selected from the group consisting of 0 mol % to 25 mol % of a $Nb_2O_5$ component, and 0 mol % to 40 mol % of a ZnO component, by mol % on the basis of oxides.

3. The optical glass according to claim 1, comprising 0 mol % to 30 mol % of a $Bi_2O_3$ component, and 0.2 mol % to 60 mol % of a total content of the $TeO_2$ component and the $Bi_2O_3$ component, by mol % on the basis of oxides.

4. The optical glass according to claim 1, comprising 0 mol % to less than 1 mol % of a $Ga_2O_3$ component, by mol % on the basis of oxides.

5. The optical glass according to claim 1, comprising 30 mol % to 60 mol % of the $B_2O_3$ component, and 0.2 mol % to 50 mol % of the $TeO_2$ component, by mol % on the basis of oxides.

6. The optical glass according to claim 5, comprising 0 mol % to 20 mol % of a $Bi_2O_3$ component, and 0.2 mol % to 50 mol % of a total content of the $TeO_2$ component and the $Bi_2O_3$ component, by mol % on the basis of oxides.

7. The optical glass according to claim 1, comprising 25 mol % to 60 mol % of the $B_2O_3$ component, by mol % on the basis of oxides.

8. The optical glass according to claim 7, comprising 0 mol % to less than 5 mol % of a $Nb_2O_5$ component, by mol % on the basis of oxides.

9. The optical glass according to claim 7, comprising 1 mol % to 40 mol % of a ZnO component, by mol % on the basis of oxides.

10. The optical glass according to claim 1, comprising 5 mol % to 55 mol % of the $B_2O_3$ component, and 1 mol % to 25 mol % of the $WO_3$ component, by mol % on the basis of oxides.

11. The optical glass according to claim 10, comprising 0 mol % to less than 5 mol % of a ZnO component, by mol % on the basis of oxides.

12. The optical glass according to claim 11, comprising 0 mol % to less than 1 mol % of the ZnO component, by mol % on the basis of oxides.

13. The optical glass according to claim 10, comprising substantially no ZnO component.

14. The optical glass according to claim 10, comprising 1 mol % to 25 mol % of a $Nb_2O_5$ component, by mol % on the basis of oxides.

15. The optical glass according to claim 10, comprising 3 mol % to 50 mol % of the $TeO_2$ component, by mol % on the basis of oxides.

16. The optical glass according to claim 15, comprising 1 mol % to 20 mol % of a $Bi_2O_3$ component, by mol % on the basis of oxides.

17. The optical glass according to claim 1, comprising, by mol % on the basis of oxides, the following components:
   $Rn_2O$ (Rn represents at least one selected from the group consisting of Li, Na, K and Cs) is 0 mol % to 15 mol %;
   RO (R represents one or more selected from the group consisting of Ba, Sr, Ca and Mg) is 0 mol % to 20 mol %;
   $SiO_2$ is 0 mol % to 20 mol %;
   $GeO_2$ is 0 mol % to 20 mol %;
   $P_2O_5$ is 0 mol % to 10 mol %;
   Total content of $Y_2O_3$, $Gd_2O_3$ and $Yb_2O_3$ is 0 mol % to 20 mol %;
   $Ta_2O_5$ is 0 mol % to 10 mol %;
   $ZrO_2$ is 0 mol % to 10 mol %;
   $Al_2O_3$ is 0 mol % to 20 mol %;
   $TiO_2$ is 0 mol % to 30 mol %;
   Total content of $TiO_2$ and $Nb_2O_5$ is 0 mol % to 45 mol %; and
   Total content of $Sb_2O_3$ and $As_2O_3$ is 0 mol % to 5 mol %.

18. The optical glass according to claim 17, comprising 0 mol % to 10 mol % of the $Al_2O_3$ component, by mol % on the basis of oxides.

19. The optical glass according to claim 17, comprising 0 mol % to less than 1 mol % of a total content of the $TiO_2$ component and the $Nb_2O_5$ component, by mol % on the basis of oxides.

20. The optical glass according to claim 17, comprising, by mol % on the basis of oxides, the following components:
   $Rn_2O$ is 0 mol % to 10 mol %;
   RO is 0 mol % to 10 mol %;
   Total content of $Y_2O_3$, $Gd_2O_3$ and $Yb_2O_3$ is 0 mol % to 10 mol %;
   $Al_2O_3$ is 0 mol % to 10 mol %; and
   $TiO_2$ is 0 mol % to 15 mol %.

21. The optical glass according to claim 1, having a refractive index ($n_d$) of 1.80 to 2.10.

22. The optical glass according to claim 1, having a refractive index ($n_d$) of 1.80 to 2.10, and an Abbe number ($v_d$) of no less than 18.

23. The optical glass according to claim 1, having a glass transition temperature (Tg) of no more than 680° C.

24. The optical glass according to claim 23, having a glass transition temperature (Tg) of no more than 650° C.

25. The optical glass according to claim 1, wherein the wavelength showing 70% transmittance is no more than 550 nm in a glass of 10 mm in the thickness.

26. The optical glass according to claim 1, wherein the wavelength showing 70% transmittance is no more than 500 nm in a glass of 10 mm in the thickness.

27. A preform for the precision press molding consisting of an optical glass according to claim 1.

28. An optical element consisting of an optical glass according to claim 1.

29. The optical glass according to claim 1, comprising 10 mol % to 30 mol % of a $Bi_2O_3$ component, by mol % on the basis of oxides.

* * * * *